United States Patent [19]

Geiger

[11] Patent Number: 5,250,268
[45] Date of Patent: Oct. 5, 1993

[54] CATALYTIC CLEANING ARRANGEMENT FOR EXHAUST FROM AN INTERNAL COMBUSTION ENGINE

[75] Inventor: Istvan Geiger, Braunschweig, Fed. Rep. of Germany

[73] Assignee: Volkswagen AG, Wolfsburg, Fed. Rep. of Germany

[21] Appl. No.: 948,349

[22] Filed: Sep. 21, 1992

Related U.S. Application Data

[63] Continuation of Ser. No. 666,894, Mar. 8, 1991, abandoned.

[30] Foreign Application Priority Data

Mar. 9, 1990 [DE] Fed. Rep. of Germany ....... 4007419

[51] Int. Cl.[5] ................................................. F01N 3/20
[52] U.S. Cl. ..................................... 422/174; 60/286; 60/287; 60/298; 60/302; 60/324; 422/171; 422/177; 422/180
[58] Field of Search ............... 422/168, 171, 177, 180, 422/174; 60/286, 287, 298, 302, 324

[56] References Cited

U.S. PATENT DOCUMENTS

| | | | |
|---|---|---|---|
| 3,791,143 | 2/1974 | Keith et al. | 422/171 |
| 4,023,360 | 5/1977 | Wössner et al. | 422/171 |
| 4,817,385 | 4/1989 | Kumagai | 422/171 |

FOREIGN PATENT DOCUMENTS

| | | |
|---|---|---|
| 1451881 | 1/1969 | Fed. Rep. of Germany . |
| 2062500 | 6/1972 | Fed. Rep. of Germany . |
| 2210031 | 9/1973 | Fed. Rep. of Germany . |
| 2303773 | 8/1974 | Fed. Rep. of Germany . |
| 2322057 | 11/1974 | Fed. Rep. of Germany . |
| 2613607 | 10/1976 | Fed. Rep. of Germany . |
| 3406968 | 3/1985 | Fed. Rep. of Germany . |
| 3740238 | 6/1988 | Fed. Rep. of Germany . |

*Primary Examiner*—Timothy M. McMahon
*Attorney, Agent, or Firm*—Brumbaugh, Graves, Donohue & Raymond

[57] ABSTRACT

In the typical embodiment described in the specification, the exhaust system of an internal combustion engine has two exhaust lines with corresponding catalyst assemblies, each assigned to one group of combustion chambers. During the cold start of the engine, an electric heater included in one of the exhaust lines heats exhaust gases flowing to a first catalyst assembly and the catalyst assemblies are connected in series so that the exhaust gases supplied to the second catalyst assembly are received from the first catalyst assembly. In addition, the ignition point of the engine is retarded after idling speed is reached. To avoid overheating of the catalyst assemblies, the catalyst assemblies receive exhaust gases only after their start-up temperatures are reached from the groups of combustion chambers associated with them and an exhaust cooling line is provided to cool exhaust gases flowing to the first catalyst assembly.

14 Claims, 1 Drawing Sheet

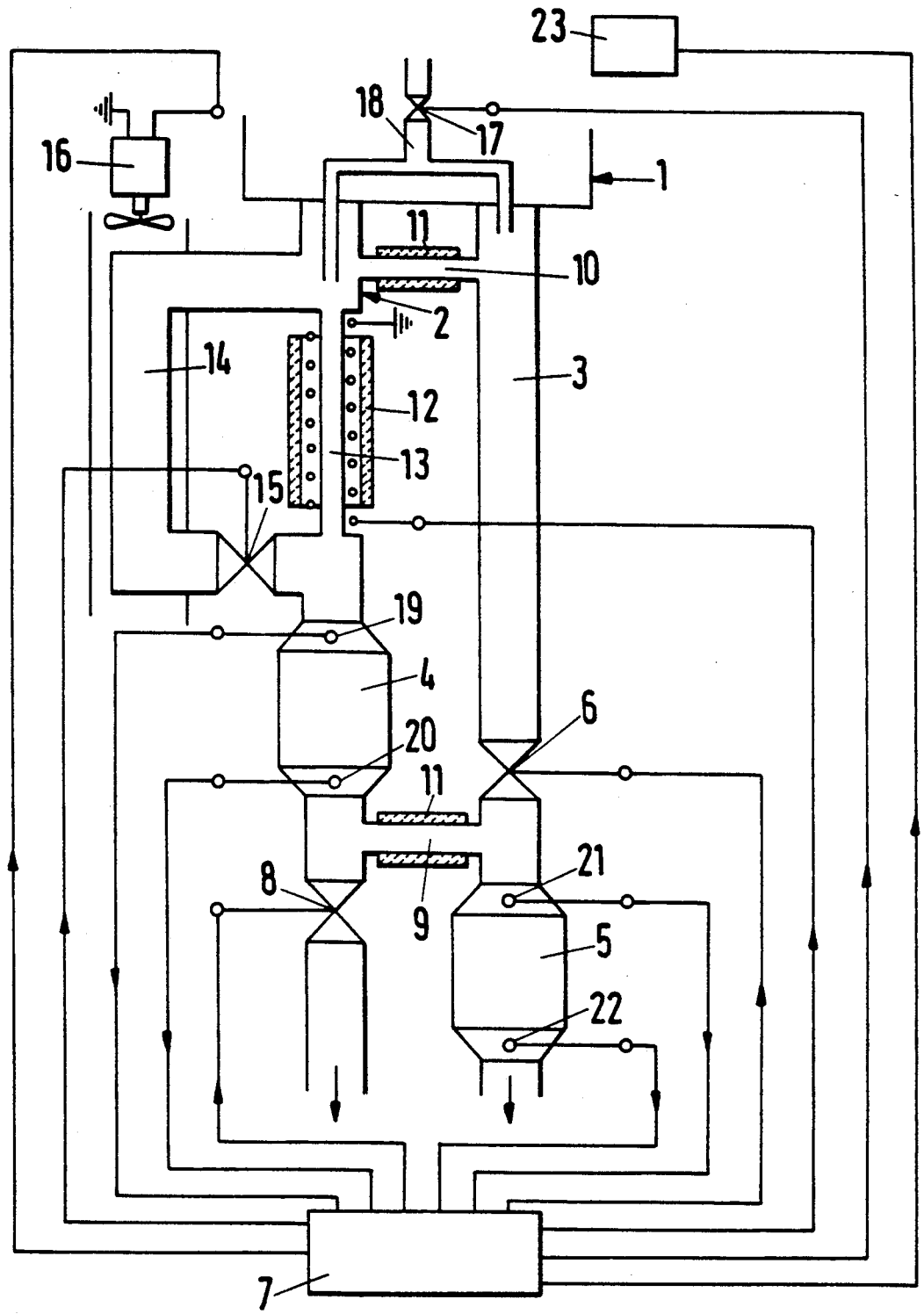

CATALYTIC CLEANING ARRANGEMENT FOR EXHAUST FROM AN INTERNAL COMBUSTION ENGINE

This application is a continuation of application Ser. No. 07/666,894, filed on Mar. 8, 1991, now abandoned.

BACKGROUND OF THE INVENTION

This invention relates to catalytic cleaning systems for exhaust gases from internal combustion engines which have two exhaust lines and corresponding catalytic converters, each receiving exhaust from at least one combustion chamber.

The most effective device for cleaning the exhaust of internal combustion engines with spark-controlled ignition is a controlled three-way catalyst in which oxidizing and reducing reactions with various exhaust gas constituents occur simultaneously. The efficacy, or efficiency, of such catalysts is specified in terms of the conversion factor, which defines the extent to which those chemical reactions actually go forward in the catalyst as a percentage of the conversion of the specified gas constituents. This conversion factor varies with temperature and, in order for the catalyst to be fully effective, the catalyst temperature must exceed a minimum temperature, which is referred to as the start-up temperature. As the catalyst ages, the catalyst start-up temperature increases and, at the same time, its maximum attainable conversion factor decreases.

Thus, while the exhaust system must be arranged so that the catalyst start-up temperature is reached as soon as possible during operation of the engine, even after a cold start, on the other hand, it must also be arranged to limit the maximum temperature to which the catalyst is subjected, since excessive temperatures will more than proportionally accelerate aging of the catalyst. Accordingly, to ensure a high conversion factor of the catalyst over a long service life, the catalyst must be operated within a temperature range that becomes ever narrower with increasing service time, i.e., between a substantially constant upper temperature limit to minimize the effects of aging and a start-up temperature which increases with aging.

During normal operation of an internal combustion engine, especially one used in a motor vehicle, however, wide fluctuations of exhaust temperature occur. This variation in temperature prevents optimal catalyst performance, at least in certain modes of operation of the engine.

German Offenlegungsschrift No. 2 322 057 discloses an arrangement for catalytic afterburning of exhaust gases of a multicylinder internal combustion engine which allows for the low heat content of the exhaust immediately after a cold start by assigning an individual catalyst to each of the two banks of cylinders on the exhaust side and routing the exhaust from both banks of cylinders through one catalyst only, in response to signals from exhaust temperature sensors, until a certain exhaust temperature is achieved so that the catalyst will warm up quickly. Only after a preassigned minimum exhaust temperature has been reached will the exhaust be directed to the second catalyst as well. However, this arrangement has the disadvantage that the second catalyst, when cut in, has not yet been warmed up, and it must be heated by the hot exhaust gases to its start-up temperature so that, for a short period of time, the exhaust gases will pass through the second catalyst without having been cleaned. Furthermore, the first catalyst, which receives all of the exhaust gases immediately after a cold start, must be large enough to process the exhaust from all of the combustion chambers of the engine, since for a time that catalyst alone will be receiving the entire exhaust flow.

Nevertheless, this known arrangement with separate exhaust catalysts assigned to banks or groups of cylinders takes into account the temperature situation that arises in a cold start. Other arrangements having catalysts individual to banks of cylinders and having connections between the exhaust lines ahead of the catalyst are intended to create a pressure equalization ahead of the catalysts, as described in German Offenlegungsschrift No. 2 613 607, and/or to make the exhaust gas compositions in the lines leading to the two catalysts uniform, as described in German Offenlegungsschrift No. 3 740 238, without making allowance for special temperature conditions.

German Offenlegungsschrift No. 1 451 881 describes a device for catalytic conversion of exhaust gases from an internal combustion engine in which, after a cold start, two catalysts in series are charged with the exhaust gases from all combustion chambers. After heating of the exhaust gases, opening of a valve bypasses the smaller catalyst, which is closer to the combustion chambers and hence is heated more rapidly, so that only the larger catalyst, which is more distant from the combustion chambers, is employed for exhaust cleaning. This known device behaves favorably with respect to rapid exhaust cleaning after a cold start in two respects. First, the exhaust gases heat the smaller catalyst which is close to the combustion chambers comparatively rapidly. In addition, heating of the second, larger catalyst is simultaneously effected by the hot exhaust leaving the first catalyst and that heating may be further accelerated by means of heat-insulating jackets. Nevertheless, the lapse of time before adequate exhaust cleaning commences is comparatively long and, moreover, this arrangement does not meet the requirement for limiting the maximum temperature of the catalyst in order to prolong its life. On the contrary, it affords no possibility of limiting the temperature of the catalysts, especially since the catalysts and connections between them are heat-insulated for more rapid heating. This rapid heating is accomplished at the cost of a rapid aging of the catalysts.

A one-sided arrangement addressed exclusively to avoiding an overheating of the catalysts is disclosed in German Offenlegungsschrift No. 3 406 968. To ensure an optimum operating temperature for an exhaust catalyst, the exhaust in this arrangement is divided into two streams ahead of the catalyst and one of the streams is cooled while the other is not cooled. The two streams are reunited ahead of the catalyst in proportions selected in accordance with the temperatures of the streams. Thus, in the case of a cold start, the catalyst is charged exclusively with the uncooled partial exhaust stream but, because of the cold start, this stream is not yet hot.

Much the same assessment may be made of the arrangement for exhaust gas routing described in German Offenlegungsschrift No. 2 303 773. In this case, the supply of exhaust to a single catalyst takes place either by way of a thermally insulated exhaust line or by way of a cooling coil exposed to the airstream or placed in the flow of air from a fan. Any acceleration of the heating of the catalyst to its start-up temperature in a cold start is, at best, provided by the heat insulation of the exhaust line.

A more active solution than this is described in German Offenlegungsschrift No. 2 062 500. Here the exhaust gases, before they enter the catalyst, pass through an electric heater actuated before, during and/or after starting of the engine. This device requires a relatively large quantity of energy for the heating device, since that device must be designed to accelerate the heating of the single catalyst which receives all of the exhaust gases. Moreover, this arrangement does not satisfy the requirement for limiting the maximum catalyst temperature.

An entirely different principle is utilized in the arrangement described in German Offenlegungsschrift No. 2 210 031. In this arrangement, the ignition point is retarded and the throttle is opened wide during a cold start and during the usual idling operation of the engine following the cold start. Although increased retarding of ignition of the fuel-air mixture supplied to the combustion chambers of the engine correspondingly decreases the output of the engine, this is not important as long as the frictional resistance of the engine components is overcome sufficiently to maintain idling operation. The point is that with increasing retardation of ignition, the temperature of the engine exhaust rises, and the energy released by combustion is increasingly transformed into exhaust heat. A special advantage of this arrangement is that external energy, such as electrical energy from a battery in the case of a motor vehicle, is not required to accelerate the heating of the catalyst. Instead, the catalyst heating is effected only by varying operating parameters, i.e., the ignition point and the throttle setting, of the engine, utilizing the existing phases of engine operation. As soon as a load demand is placed upon the engine, the operating parameters are automatically restored to its value in normal operation, in particular, the travelling mode, i.e., the ignition point is advanced and the throttle opening is reduced according to the load demand. What this arrangement does not provide is a limitation of the maximum catalyst temperature. Moreover, the heating of the catalyst after a cold start is not optimized because of the use of a single and accordingly comparatively large catalyst.

As the foregoing analysis of the relevant prior art clearly shows, the art has been aware for decades of the twofold problem, i.e., the necessity for rapid heating of the catalyst and the requirement for limitation of the maximum catalyst temperature, and there have been many attempted solutions. Nevertheless, each of the prior art arrangements relates essentially to only one of the two problems.

SUMMARY OF THE INVENTION

Accordingly, it is an object of the present invention to provide a catalytic cleaning arrangement for exhaust gases from an internal combustion engine which overcome the abovementioned disadvantages of the prior art.

Another object of the invention is to provide a catalytic cleaning arrangement such that the warm-up time after a cold start of the engine or, in other words, until the start-up temperature of the catalyst is reached, is substantially shortened, and also the temperature of the catalyst, once the start-up temperature has been reached, is kept substantially constant.

Another object of the invention is to provide a catalytic cleaning arrangement which allows for the rise in start-up temperature of the catalyst with progressive aging.

These and other objects of the invention are attained by providing first and second exhaust lines from different combustion chambers of the engine with corresponding first and second catalyst assemblies, the first exhaust line including an electric heater and an exhaust cooling arrangement and having its catalyst assembly closer to the engine than the catalyst assembly of the second exhaust line and valved flow connections between the first and second exhaust lines for arranging the exhaust flow path from both exhaust lines to pass in series through the first and second catalyst assemblies.

The invention utilizes devices individually known in the prior art as discussed above, but combines them in a novel arrangement so that all of the desired objectives are accomplished with a minimum supply of external energy and with a minimum size of the catalyst assemblies. Thus, the arrangement according to the invention permits the following sequence of operation of an engine and the catalyst components from a cold engine start.

For example, upon actuation of the ignition key, a circuit is closed to provide electric heating to preheat the exhaust gas line ahead of the first catalyst, as well as of the gases contained in that portion of the exhaust line. This action takes account of the fact that, during starting of the engine, the supply of fuel mixture and the setting of the ignition point are optimal for engine starting rather than for the composition of the exhaust gases. Of course, provision is made so that the exhaust line heater will be switched on only when it will not prevent the starter from achieving its starting speed.

As soon as the engine has been started and its speed increased so that its idling speed is attained, the combustion control arrangement priorities are altered. It is, of course, a prerequisite that the idling speed is stable or, in other words, that the operating parameters of the engine are not so adjusted as to prevent stable idling. Stability of the idling speed may be monitored in any conventional manner based on whether the engine runs quietly or not. Proceeding from this basic requirement, a retarded ignition point is then set for rapid attainment of a high conversion factor for the first exhaust catalyst assembly. "Catalyst assembly" in this context is intended to mean that in each of the two exhaust lines, one or more catalysts may be arranged, to be referred to collectively as an "assembly". After the idling speed has been attained, the ignition point will be retarded, and secondary air may be supplied if necessary to the first catalyst assembly. Consequently, since the electric heater is still switched on, oxidizing processes causing a preheating of the exhaust gases to be supplied to the first catalyst assembly will occur in the heated portion of the line and, because of an excess of air, an oxidizing operation will result in the first catalyst assembly, further accelerating the heating of the exhaust gases issuing from that catalyst assembly. All this time, the second catalyst assembly is connected in series with the first catalyst assembly, so that the heating of the exhaust gases leads to an acceleration in the heating of the second catalyst assembly.

In contrast to the location of the first catalyst assembly close to the engine, the second catalyst assembly is so far removed from the heat-generating combustion chambers of the engine that, even under the most adverse operating conditions, i.e., full load with high ambient temperatures, overheating of the catalyst assembly cannot occur.

As soon as the engine changes from the idling mode because of a demand for power, the engine operating priorities are again altered. Stability of engine speed is no longer of interest and a choice of operating parameters of the engine such as to achieve optimal fuel consumption becomes most important. This requires an advancement of the ignition point with respect to the idling condition. Since the exhaust catalysts have now attained their start-up temperature, the electric heater is switched off and, by monitoring of temperatures especially in the region of the first catalyst assembly, the system assures that any overheating of a catalyst is avoided. For this purpose, the exhaust cooling arrangement in the first exhaust line, which may be arranged parallel to the electric heater, becomes operative. This cooling arrangement may comprise, for example, a portion of the exhaust line disposed in the airstream or in the path of air from a fan that may be switched on in response to increased exhaust gas temperature. This cooling line should thus have poor heat insulation from the environment.

All temperature-controlled switching operations both in the operation of the engine, i.e., ignition time, throttle setting, etc., and in the operation of the exhaust system, i.e., heating, exhaust cooling line, etc., are controlled by a microprocessor which responds to signals from appropriate temperature sensors. Since such control systems are conventionally employed in motor vehicles for engine management, specific details concerning such systems need not be described. The start-up temperatures for the catalysts used in the catalyst assemblies and the variations in starting temperature with aging are stored in the control system.

The arrangement of the invention therefore permits not only an acceleration of exhaust cleaning during starting but also ensures optimum conditions for exhaust cleaning during phases of engine operation following a cold start. Thus, for example, the secondary air supply may be switched on whenever there are CO and HC components present in the exhaust gases, that is, not only during a cold start but also when the air coefficient is less than 1 and in the braking mode of the engine.

BRIEF DESCRIPTION OF THE DRAWING

Further objects and advantages of the invention will be apparent from a reading of the following description in conjunction with the accompanying drawing, which is a schematic diagram illustrating a representative catalytic cleaning arrangement for exhaust gases from an internal combustion engine arranged in accordance with the invention.

DESCRIPTION OF PREFERRED EMBODIMENT

In the typical embodiment of the invention shown in the drawing, an internal combustion engine 1 has combustion chambers which are assembled in two groups, each of which may, but does not necessarily, include the combustion chambers of a row or bank of cylinders. The exhaust manifolds from these two groups are connected to two exhaust lines 2 and 3 having corresponding catalyst assemblies 4 and 5, respectively. These catalyst assemblies contain three-way catalysts of conventional construction. As shown in the drawing, the second catalyst assembly 5 is mounted at a comparatively remote position with respect to the engine 1, which is hot in operation. Thus, the portion of the exhaust line 3 between the engine and the catalyst is sufficiently long to ensure that the catalyst assembly 5 will not be heated above its maximum temperature limit even in extreme phases of operation of the engine, such as during mountain travel in midsummer. A first valve 6, disposed in the exhaust line 3 upstream from the catalyst assembly 5 is opened or closed according to signals supplied from a microprocessor control system 7.

A second valve 8 is located downstream from the first catalyst assembly 4 in the first exhaust line 2, and two flow connections 9 and 10, each of which is surrounded by heat insulation 11, are provided between the two exhaust lines 2 and 3.

The first flow connection 10 is located at the ends of the exhaust lines adjacent to the engine and, between that flow connection and the first catalyst assembly 4, there is an electric heater 12 enclosing a portion 13 of the first exhaust line 2. This heater is designed so that when switched on it effects a rapid heating of the portion 13 of the line as well as the gases contained in that line.

An exhaust gas cooling line 14 is arranged in parallel with the line 13 which is surrounded by the heater 12 and a control valve 15 is located in the line 14 near the entrance to the associated catalyst assembly 4 in a manner similar to the arrangement for the control valve 6. As a result, there are storage spaces upstream of the valves 6 and 15 in the lines 3 and 4 for exhaust gases generated during the first strokes of the engine 1 in a cold start.

The exhaust cooling line 14, for an internal combustion engine mounted in a motor vehicle, is expediently located in the airstream. In the illustrated embodiment, the line 14 receives air from a cooling air fan 16 which is controlled by the microprocessor 7 in accordance with the temperature of the catalyst assembly 4.

A valve 17, disposed in a secondary air supply line 18, is also controlled by the microprocessor 7 to cause air to be injected from the line 18 into both exhaust lines 2 and 3. The outlet of the secondary air supply line 18 in the exhaust line 2 is located close to the entrance to the heatable line 13 so that as much air as possible from the secondary air supply line will pass directly into that line. Consequently, when the heater 12 is switched on to effect heating of the exhaust gases, some oxidation occurs even before the gases enter the first catalyst assembly 4.

As previously explained, the microprocessor 7 operates in response to temperature signals generated by temperature sensors. Four such sensors, 19 and 20 and 21 and 22, respectively, are provided in the two catalyst assemblies 4 and 5, the sensors 19 and 21 being on the catalyst input side and the sensors 20 and 22 being on the catalyst output side. These sensors provide information from which aging of the catalyst material can be determined.

According to these temperature signals, the microprocessor 7 will also deliver control signals to the ignition system 23 for the engine 1. As a result of this arrangement, the catalyst exhaust cleaning system operates in the following manner.

In a cold start, as determined by the temperature readings detected upon actuation of an ignition key to start the engine 1, the electric heater 12 is switched on. This rapidly heats the portion 13 of the first exhaust line 2 as well as the gas contained therein. Because of the location of the valves 6 and 15 comparatively close to the inlets of the two catalyst assemblies 4 and 5, as described above, a large portion, if not all, of the exhaust gases emitted during the first stroke of the engine 1 will be stored, as it were, until the valves 6 and 15, which are closed during a cold start, are subsequently opened. During the cold-start operation, the fuel-air mixture supplied to the engine is proportioned so that the air coefficient is less than 1 and a comparatively early ignition time, optimal for the starting operation, is set by the microprocessor 7. Thus, during the lapse of time until idling speed is attained and the exhaust gases are hot, i.e., while the engine speed is increasing, the exhaust gases supplied to the first catalyst assembly 4 are heated by the operation of the electric heater 12.

As soon as the engine 1 has reached idling speed, its operating parameters are altered, while monitoring the stability of the idling speed, so as to require a high conversion factor of the catalyst assemblies 4 and 5. For this purpose, by appropriate signals from the microprocessor 7 to the ignition system 23 of the engine 1, the ignition point is retarded, so that, when no power is demanded of the engine, i.e., a true idling mode, the engine emits hot exhaust gases having CO and HC components which are oxidized in the heated line portion 13, thereby further heating the exhaust gases to be supplied to the first catalyst assembly 4. Also, excess air received from the secondary air supply line 18, which is turned on at this time, promotes oxidation of the exhaust constituents. The second valve 8 is closed at this time, causing the exhaust gases to pass from the catalyst assembly 4 through the connecting line 9 to the catalyst assembly 5, thereby rapidly heating that catalyst assembly.

If the engine is operated in the idling mode for some time and the start-up temperature has been reached in both catalyst assemblies 4 and 5, the microprocessor control unit 7 will change the engine operating conditions to give priority to low fuel consumption. Thus, after the start-up temperature has been reached, at least for the first catalyst assembly 4, the electric heater 12 is switched off and, to achieve optimum fuel consumption operation of the engine, whether in prolonged idling or upon load demand, the ignition point will be correspondingly advanced. The secondary air supply line 18 is also switched off by actuation of its associated valve 17, but it may be switched on again, either in the engine braking mode or whenever oxidation is required by the presence of CO and HC components in the exhaust gases.

Any overheating of the second catalyst assembly 5 will as a general rule be avoided by the mere fact that it is located comparatively far from the heat-generating combustion chambers of the engine 1. Also, any overheating of the first catalyst assembly 4 is prevented by cutting in the exhaust cooling line 14 by opening the valve 15. The valve 15 may open under temperature control or alternatively under load control, so that a rapid cooling effect and large exhaust passages will be provided in case of sudden increases in load demand. As soon as this valve is triggered, the cool exhaust gases stored in the cooling line 14, which has a larger cross-section than the line portion 13, enter the catalyst assembly 4. Because of this relation between the cross-sectional areas, most of the newly emitted exhaust gases will enter the catalyst assembly 4 only after cooling in the line 14.

Once the second catalyst 5 has reached its start-up temperature, the first valve 6 is opened, so that the second catalyst assembly 5 receives exhaust gases from the combustion chambers associated with it directly through the portion of the second exhaust line 3 upstream of the valve 6.

At the same time, the second valve 8 is also opened, permitting exhaust gases from the catalyst assembly 4 to flow out of the downstream end of the exhaust line 2. This renders the second connection 9 largely ineffective so that both the starting catalyst assembly 4 and the second catalyst assembly 5 are operative to clean approximately equal proportions of the exhaust gases from the engine 1.

As the foregoing description of a representative embodiment illustrates, in the cold condition, the two catalyst assemblies are in series with the exhaust outlets of all of the combustion chambers of the engine, whereas, after the start-up temperature is reached, each of the two catalyst assemblies is acted upon only by the exhaust of the group of combustion chambers associated with it. This means that neither of the catalyst assemblies needs to be large enough to process the entire volume of exhaust gases emitted by the engine at its maximum output.

The invention thus provides an arrangement for cleaning exhaust gases which, with a minimal expenditure of external energy, ensures an optimum mode of operation of the exhaust cleaning system of an internal combustion engine.

Although the invention has been described herein with reference to a specific embodiment, many modifications and variations therein will readily occur to those skilled in the art. Accordingly, all such variations and modifications are included within the intended scope of the invention.

I claim:

1. Apparatus for catalytic cleaning of the exhaust gases of an internal combustion engine comprising an engine having a plurality of combustion chambers, first and second exhaust lines for receiving exhaust from different combustion chambers in the engine, each exhaust line including a catalyst assembly and being arranged to receive exhaust gases from at least one combustion chamber, a first flow connection between the two exhaust lines in the upstream direction from the catalyst assemblies, heater means for heating exhaust gases flowing through a portion of the first exhaust line upstream from the catalyst assembly therein and downstream from the first flow connection, cooling means for cooling hot exhaust gases flowing through a portion of the first exhaust line, the catalyst assembly in the second exhaust line being located at a distance from the engine which is far enough to avoid heating of the catalyst assembly above a selected temperature to inhibit catalyst aging, a second flow connection connecting the first and second exhaust lines downstream from the catalyst assembly in the first exhaust line and upstream from the catalyst assembly in the second exhaust line, valve means in the first and second exhaust lines and valve control means arranged to connect the catalyst assemblies in the first and second exhaust lines and the heater means in series when the temperature of the second catalyst assembly is below its start-up temperature and to connect each exhaust line to only one of the catalyst assemblies when both catalyst assemblies are above their start-up temperatures.

2. Apparatus according to claim 1 further including additional means for supporting oxidizing of the exhaust gases in the catalyst assemblies.

3. Apparatus according to claim 2 further including means for retarding the ignition point in the engine after attainment of idling speed in the no-load operating condition of the engine for rapid attainment of a high conversion factor for the first catalyst assembly.

4. Apparatus according to claim 2 further including means for providing a secondary air supply upstream from the first catalyst assembly after engine idling speed has been reached in the no-load operating condition of the engine.

5. Apparatus according to claim 4 wherein the secondary air supply injects air into the first exhaust line upstream from the heater means.

6. Apparatus according to claim 1 further including heat-insulating means for insulating at least one of the first and second flow connections.

7. Apparatus according to claim 1 wherein the valve means includes a first valve located in the second exhaust line immediately upstream from the second flow connection so that the portion of the second exhaust line upstream from the first valve forms a reservoir for exhaust gases emitted before engine idling speed is reached.

8. Apparatus according to claim 7 wherein the valve control means includes means for opening the first valve only after the start-up temperature of the second catalyst assembly has been attained.

9. Apparatus according to claim 1 wherein the valve means includes a second valve located in the first exhaust line downstream from the second flow connection and the valve control means includes means for opening the second valve only when the first valve is open.

10. Apparatus according to claim 1 wherein the cooling means is disposed in a bypass line portion of the first exhaust line which bypasses the portion of that line containing the heater means and the bypass line portion includes a valve adjacent to its downstream end which is actuated in accordance with the temperature in the region of the first catalyst assembly so as to form a reservoir in the bypass line for exhaust gases emitted before idling speed is reached in the region upstream from the bypass line valve.

11. Apparatus according to claim 1 further including temperature sensor means disposed adjacent to each of the catalyst assemblies in different regions to detect temperatures which depend on the conversion factor in the operation of the catalyst assembly and wherein the valve control means is arranged to actuate the first and second valves and the bypass valve in order to achieve a predetermined exhaust gas conversion factor.

12. Apparatus according to claim 1 wherein the valve control means is arranged so that the first and second valves and the bypass line valve are closed prior to a cold engine start.

13. Apparatus according to claim 1 wherein the valve control means is arranged to control the valve means to regulate the flow of gases through the first exhaust line catalyst assembly to provide a constant exit temperature of the gases therefrom during load operation of the engine.

14. Apparatus according to claim 1 wherein the catalyst assembly in the first exhaust line has the capacity to clean the exhaust gases from all of the engine combustion chambers during idling operation and the two catalyst assemblies have the capacity to clean the exhaust gases from all combustion chambers of the engine during full-load operation.

* * * * *